No. 775,710. PATENTED NOV. 22, 1904.
G. THOM.
MIXER.
APPLICATION FILED JUNE 28, 1904.
NO MODEL.
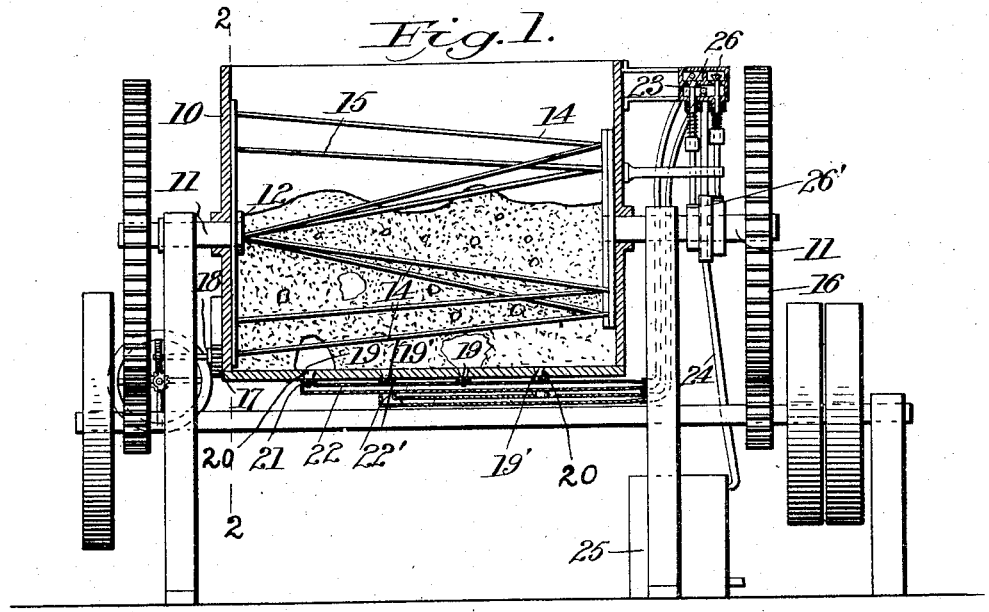
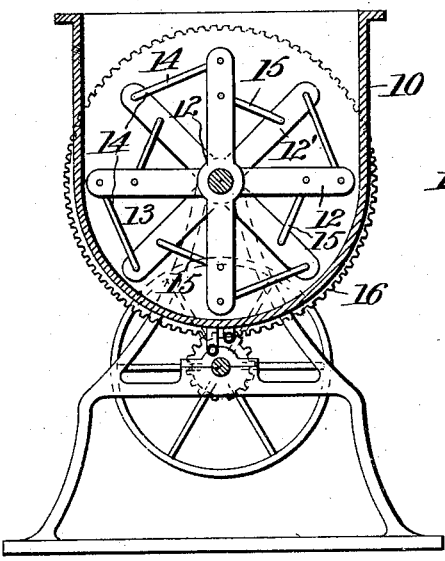
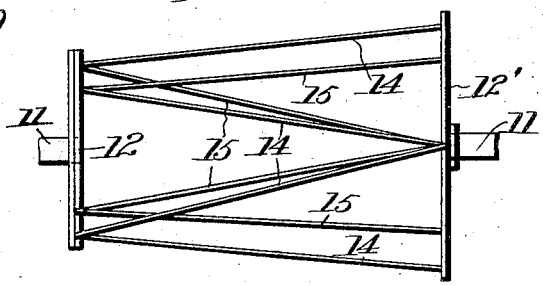
Witnesses
C. H. Walker
O. W. Harrison
Inventor
George Thom
by Wm. S. Hodges
Attorney No. 775,710.                                                    Patented November 22, 1904.

UNITED STATES PATENT OFFICE.

GEORGE THOM, OF WASHINGTON, DISTRICT OF COLUMBIA.

MIXER.

SPECIFICATION forming part of Letters Patent No. 775,710, dated November 22, 1904.

Application filed June 28, 1904. Serial No. 214,528. (No model.)

*To all whom it may concern:*

Be it known that I, GEORGE THOM, of Washington, in the District of Columbia, have invented certain new and useful Improvements in Mixers; and I do hereby declare the following to be a full, clear, and exact description of the invention, such as will enable others skilled in the art to which it appertains to make and use the same.

This invention relates to certain new and useful improvements in mixers, and pertains more particularly to that class of machines employed for mixing bread, cake, and other similar doughs, icings, and the like.

The invention has for its object the production of a machine or apparatus by means of which the contents of the mixer are thoroughly worked and intermingled.

A further object is to provide simple and efficient means for aerating and agitating the contents of the mixer during the mixing operation, whereby the same is made light and spongy.

The invention will be hereinafter fully set forth, and particularly pointed out in the claims.

In the accompanying drawings, Figure 1 is a longitudinal sectional view illustrating my improved mixer. Fig. 2 is a transverse sectional view on line 2 2, Fig. 1. Fig. 3 is a side elevation of the beater.

Referring to the drawings, 10 designates a casing or receptacle adapted to receive the ingredients to be mixed. Spiders 12 12' are mounted to rotate in said receptacle, the arms 13 of said spiders being relatively staggered and connected by oppositely-inclined diagonally-arranged bars 14 15. It will be observed that the bars 14 are inclined in one direction to unite the outer ends of the arms of spider 12 with the corresponding ends of the arms of the opposite spider 12', while the bars 15 are arranged to cut an arc nearer the axis of the beater and are inclined in a direction opposite to the inclination of bars 14. For instance, I have illustrated the rod 14 as being inclined to the left and the rods 15 as inclined to the right; but I do not limit myself to this specific arrangement, as the respective inclinations may be reversed without departing from the spirit of my invention. The spiders 12 12' are rotated by means of gearing 16, connected with any suitable power, and the receptacle 10 may be dumped by any suitable means, such as a segmental rack 17, meshing with a pinion 18, which may be rotated at will by means of a hand-wheel.

In the bottom of casing or receptacle 10 is formed a series of openings or ports 19 19'. Said ports are closed by check-valves 20, held normally in their seats by means of springs 21, the tension of said springs being sufficient to overcome the hydrostatic pressure within the receptacle, thereby requiring an excess of pressure to unseat said valves, thus preventing the contents of said receptacle from passing through said ports. The ports 19 19' serve as outlets for conduits 22 22', respectively, which extend from a valve-casing 23, which in turn is connected by a flexible conduit 24 with an air-condenser 25 of any suitable design. Valves 26 are mounted in casing 23 and operated by cam mechanism 26' to direct the current of air from said condenser alternately to the conduits 22 and 22'.

In practice the ingredients to be mixed are placed in the casing or receptacle, whereupon the beater is rotated by means of the gearing heretofore described. In their rotation the bars 14 and 15 cut out a portion of the mixture in the receptacle, thereby intermixing the main body of said mixture and allowing the latter to drop as the cut-out portion is carried forward by the bars. Said bars by reason of their alternate diagonal arrangement also impart a reciprocating movement to said cut-out portion of the mixture from end to end of the receptacle. In other words, as the bars 14 pass through the mixture a portion of the latter is moved forward and simultaneously given a movement in one direction; but this movement of a part of said portion is interrupted by the bars 15, which catch said portion and impels the same in the opposite direction. After the operation has continued for a short time jets of air from the condenser are alternately forced through conduits 22 22' under pressure sufficient to open valves 20, whereby air is forced below the mixture producing an upheaval directly above said valves.

The operation of the valves 26 is so timed as to open valves 19, when each rod 14 commences its action and correspondingly operate the valves 19' in conjunction with the rods 15, the effect af these jets of air being to impart an undulatory movement in the mixture, thereby subjecting different portions of the mixture to the action of the bars, the bubbles of air being cut into and disintegrated by the bars or rods 14 and 15, whereby said mixture is thoroughly aerated and rendered correspondingly light and spongy.

The advantages of my improved mixer will be apparent to those skilled in the art to which it appertains. It will be particularly observed that by forming the beater with oppositely-inclined diagonal bars the ingredients are thoroughly intermingled by the reason of the fact that said bars constantly undermine the mixture, causing different strata of the latter to be successively presented to the action thereof. A further advantage of this arrangement is that said bars from a truss-like union between the spiders, whereby the torsional strain is reduced to a minimum. It will also be noted that by forcing jets of air through the stiffer mixtures a lifting or undulatory movement is imparted thereto, whereby an additional kneading action is secured, and where the air is forced through the lighter or "slack" mixtures an ebullient effect is secured, whereby said mixture is made exceedingly light and spongy. A further advantage lies in introducing the air through the bottom of the receptacle, as the same is thereby compelled to pass into the mixture to aerate the same and said aeration is greatly assisted because of the disintegration or breaking up of the air-bubbles by the beater-bars. In this connection it will be observed that I do not limit myself to forcing air through the mixture, as carbonic-acid gas or any other suitable gas may be substituted without departing from the spirit of my invention.

I claim as my invention—

1. An improved mixer comprising a beater provided with straight diagonally-arranged beater-bars.

2. An improved mixer comprising a beater provided with oppositely-extended, diagonally-arranged beater-bars.

3. An improved mixer comprising a beater formed of oppositely-disposed spiders, and straight diagonally-arranged bars uniting said spiders.

4. An improved mixer comprising a beater formed of oppositely-disposed spiders, and oppositely-inclined, diagonally-arranged bars uniting said spiders.

5. An improved mixer comprising a beater formed of oppositely-disposed spiders and provided with relatively staggered radial arms, and straight bars uniting the staggered arms of said spiders.

6. An improved mixer comprising a beater formed of oppositely-disposed spiders and provided with relatively staggered radial arms, a series of obliquely-arranged bars uniting the outer ends of the arms of said opposite spiders, and a second series of obliquely-arranged bars also connecting the arms of said opposite spiders, said second series of bars being arranged at a different angle from said former series.

7. An improved mixer comprising a receptacle, means for imparting an undulatory movement to the contents thereof, and means for causing the contents of said receptacle to reciprocate along the bottom of the latter.

8. An improved mixer comprising a receptacle, and means for imparting a combined reciprocating and undulatory movement to the contents of said receptacle.

9. An improved mixer comprising a receptacle having a plurality of ports located in the bottom thereof, check-valves normally closing said ports, and means for introducing gases under pressure alternately through said ports.

10. An improved mixer comprising a receptacle having a plurality of ports located in the bottom thereof, check-valves normally closing said ports, a plurality of conduits leading to said ports, and valves controlling the inlets of said conduits and means for alternately operating said latter valves.

11. An improved mixer comprising a receptacle, a rotary beater mounted therein and provided with longitudinally-extended beater-bars, and means for introducing gases through the bottom of said receptacle.

12. An improved mixer comprising a receptacle, a rotary beater mounted therein and provided with longitudinally-extended diagonally-arranged bars, and means for introducing gases through the bottom of said receptacle.

13. An improved mixer comprising a receptacle having ports in its bottom, check-valves normally closing said ports, means for alternately introducing gases under pressure through said ports, and a rotary beater mounted in said receptacle.

14. An improved mixer comprising a receptacle having ports in its bottom, check-valves normally closing said ports, means for alternately introducing gases under pressure through said ports, and a rotary beater mounted in said receptacle provided with diagonally-arranged bars.

15. An improved mixer comprising a receptacle having ports in its bottom, check-valves normally closing said ports, means for introducing gases under pressure through said ports, and a rotary beater mounted in said receptacle and provided with a plurality of series of oppositely-extended diagonally-arranged bars.

16. An improved mixer comprising a receptacle having ports in its bottom, check-valves normally closing said ports, means for introducing gases under pressure through said ports, and a rotary beater mounted in said receptacle, said beater comprising oppositely-disposed spiders provided with relatively staggered radial arms, and oppositely-inclined bars uniting the staggered arms of said spiders.

In testimony whereof I have signed this specification in the presence of two subscribing witnesses.

GEORGE THOM

Witnesses:
    LEWIS HODGES,
    H. JOSEPH DOYLE.